June 24, 1930.   A. J. GRANBERG   1,767,210
FLUID METER
Filed April 30, 1928

INVENTOR.
Albert J. Granberg.
BY Townsend, Loftus & Abbett
ATTORNEYS.

Patented June 24, 1930

1,767,210

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

FLUID METER

Application filed April 30, 1928. Serial No. 273,788.

This invention relates to devices for measuring the volume of fluid and indicating the same on a calibrated dial.

It is the principal object of the present invention to generally improve and simplify devices of the character referred to whereby to provide a comparatively inexpensive meter of simple construction which will be accurate and efficient in operation.

One form which the invention may assume is exemplified in the following description and illustrated by way of example in the accompanying drawings, in which.

Figure 1:
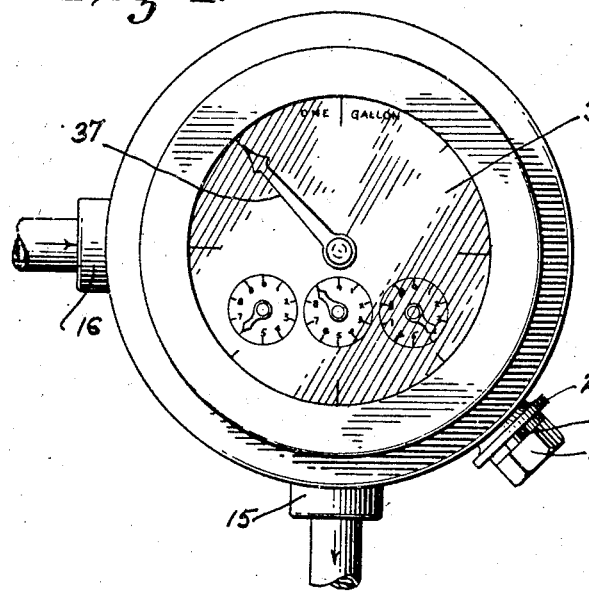
Fig. 1 is a plan view of the meter embodying the preferred form of my invention.
Figure 2:
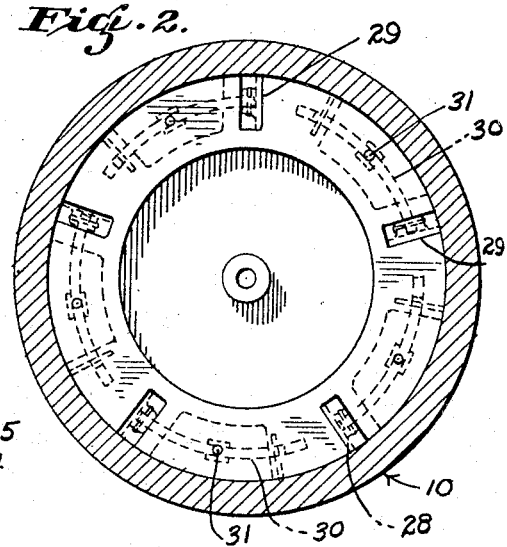
Fig. 2 is a plan section taken on line II—II of Fig. 3.

Referring more particularly to the accompanying drawings, 10 indicates a cylindrical casing. This casing is formed in two sections 11 and 12. The section 11 is the upper section and 12 is the lower section. These sections are suitably connected together by bolts, screws or other suitable devices, so that the meeting surfaces thereof will make a fluid-tight joint.

The lower section 12 is formed with a concentric channel 14 in its upper face which is rectangular in cross-section. This channel 14 extends approximately 270 degrees about the face of the lower section at a distance inwardly from its outer periphery. One end of the channel 14 communicates with an intake port 16 and the other end communicates with a discharge port 15. It is intended that these ports 15 and 16 be either tapped or flanged so that the meter may be interposed in a pipe line.

Figures 5, 7:
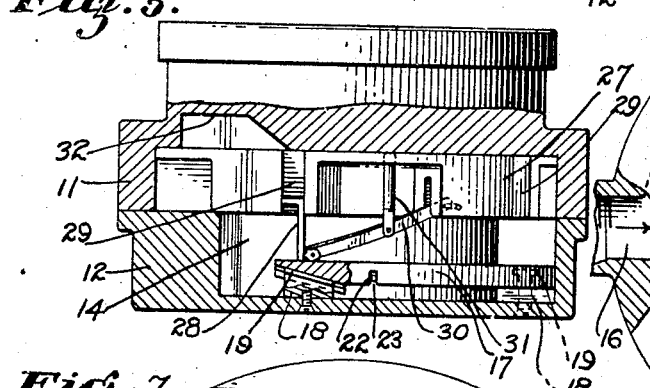
Fig. 5 is a view partially in section through the casing of the meter disclosing certain details of construction.
Fig. 7 is a perspective view of the adjustment member.
Figure 6:
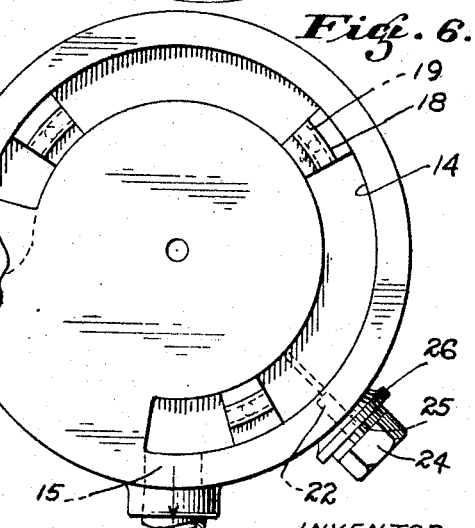
Fig. 6 is a view in plan of the lower section of the casing.

I provide means for changing the cubic capacity of the channel 14 for the purpose of adjusting the meter, so that it will accurately measure and indicate the volume of fluid passing therethrough. The means referred to comprises an adjustment member 17 of the same configuration as the channel but slightly less in length as shown in Figs. 6 and 7 of the drawings. This adjustment member 17 slidably fits within the channel 14 and constitutes for all practical purposes the bottom of the channel.

Arranged beneath the adjustment member and fixed to the lower section of the casing 12 within the channel 14 are a plurality of mountings 18 having tapered upper faces. These faces are formed with T-shaped keys 19. The bottom of the adjustment member 17 is formed with lugs 20 which align with the mountings 18. These lugs have tapered faces coinciding with the tapered faces of the mountings 18 and are formed with T-shaped slots 21 engaged by the keys 19. Therefore, the adjustment member 17 will be dove-tailed to the mountings 18 and movement of the adjustment member will cause the same to be raised or lowered according to the direction in which it is moved. This raising or lowering movement is of course due to the cam action of the co-acting tapered faces of the mountings 18 and the lugs 20.

To adjust the position of the adjustment member 17, I provide an adjustment pin 22 which rotatably extends through the side wall of the lower section 12. The inner end of this adjustment pin 22 is reduced in diameter and is eccentrically positioned. This inner end of the pin engages a radially extending slot 23 in the bottom face of the adjustment member 17, so that rotation of the pin will cause reciprocation of the adjustment member in the channel 14. Therefore, by operating the adjustment pin 22, the adjustment member 17 may be moved a limited amount in either direction to adjust its vertical position in the channel 14 and thereby regulate the volume of the channel 14.

To operate the adjustment pin 22, its outer end is formed with an enlarged nut 24 having a pointer 25 secured thereto. This pointer cooperates with a calibrated dial 26 so that the degree of adjustment may be accurately determined.

To cooperate with the channel 14 in metering fluid, the upper section 11 of the casing is formed with a chamber within which a rotor 27 snugly fits. This rotor is of the same external diameter as the channel 14 and lies contiguous to the channel at the top thereof. The rotor 27 is secured on a shaft 27ᵃ which is journalled at its ends in the sections 11 and 12.

Figure 4:
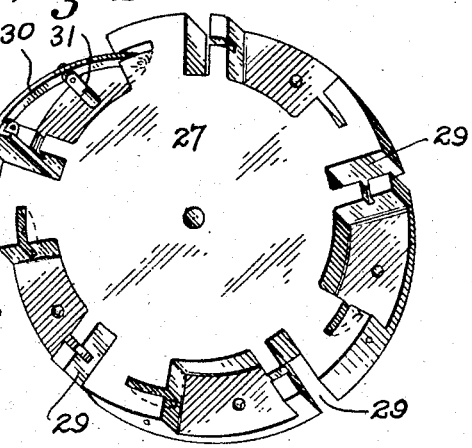
Fig. 4 is a perspective view of the rotor showing the underside thereof.

The rotor 27 is fitted with a plurality of vanes or blades 28 which are radially spaced at equal distances apart about the rotor in vertical alignment with the channel 14. The vanes 28 are arranged radially and are adapted to project downwardly from the lower face of the rotor and are of dimensions so that they will snugly fit within the channel 14 into which they project during certain portions of their cycle of operation. The rotor 27 is formed with radially spaced pockets 29, one pocket being provided for each vane 28. The vanes 28 are adapted to reciprocate in these pockets 29. Each vane 28 is pivotally connected at its lower end to one end of a lever 30 which extends in the direction in which the rotor revolves. The other end of this lever is pivoted to the rotor as shown most clearly in Figs. 4 and 5 of the drawings.

It is intended that when the blades or vanes 28 register with the intake end of the channel that they project therein. The fluid acting against these vanes or blades 28 causes the rotor 27 to revolve, metering the fluid. As the vanes reach the discharge end of the channel their levers 30 will engage the end of the channel and move the vanes upwardly into the pockets 29 where they will remain until they again register with the intake end of the channel. At this point they will emerge from the pockets and project downwardly into the channel 14.

To insure that the vanes will project into the channel 14 when they register therewith, each vane is provided with a vertical pin 31 which is connected at its lower end to the lever 30 at a point intermediate the ends of the latter. Each pin 31 extends vertically through the rotor 27 and engages a cam groove 32 formed in the upper section 11. It is seen therefore, that as the vanes register with the intake end of the channel 14, the cam groove will force the pin 31 downwardly so that the vanes will be positively projected within the channel 14.

Figure 3:
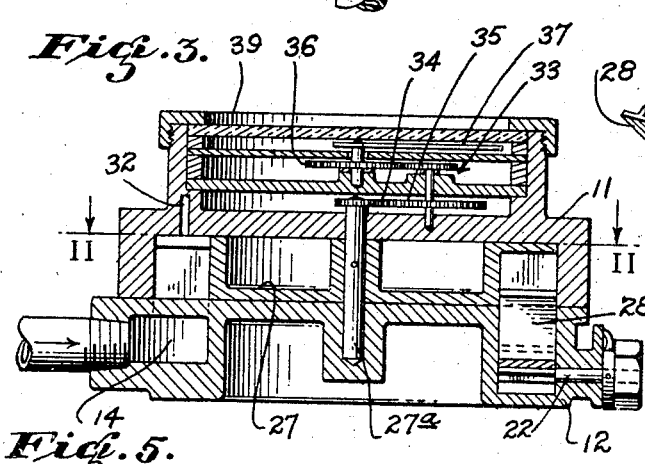
Fig. 3 is a central vertical section through the meter.

Due to the action of the fluid on the blades a predetermined volume of liquid will be dispensed through the discharge port 15 upon each complete revolution of the rotor. I translate this volume into given quantities such as gallons and parts of gallons by an indicating mechanism 33 which is driven by the rotor 27. This is most clearly shown in Fig. 3 where it will be seen that the rotor shaft is fitted with a pinion 34 driving a gear 35. This gear through the medium of an intermediate gear train 36 operates a pointer 37 which cooperates with the calibrated dial 38. This dial is secured at the top of the upper casing 11 and is covered by a transparent cover plate 39.

In operation of the device, it is constructed and assembled as shown in the drawings and the intake port 16 is connected with a source of fluid supply, and the discharge port 15 is connected with any suitable discharge medium. Fluid entering the intake port will act against the vanes 28 and drive the rotor. As the vanes approach the discharge port 15, the levers 30 will engage the discharge end of the channel 14 and will raise the vanes into their pockets 29. When the vanes again register with the channel 14 they will project therein to commence a second cycle of operation. As the volume of fluid dispensed upon the passing of each vane may be predetermined, rotation of the rotor may be translated by an indicating mechanism to indicate the exact volume dispensed.

To adjust the meter the volume of the channel 14 may be changed by raising or lowering the adjustment member 17, so that the volume dispensed may be accurately indicated by the indicating mechanism. To accomplish this it is only necessary to turn the nut 24 which will, through the medium of the eccentric pin 22, shift the adjustment member 17 endwise. Such endwise movement of the adjustment member will, due to the co-acting tapered faces between it and the bottom of the channel, cause it to be raised or lowered.

From the foregoing it is obvious that I have provided a comparatively simple and inexpensive meter which will accurately measure and indicate the volume of fluid passing therethrough.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a casing, a channel formed in the casing, relatively fixed elements revolving about a common axis and within the channel, an intake port communicating with said channel, a discharge port communicating with said channel, said elements being caused to revolve by fluid entering the channel from the intake port, the volume of fluid passing through the channel from the intake port to the discharge port being in direct ratio to the movement of said elements, means driven by said elements for indicating the volume of fluid passing through the discharge port, and means for varying the volume of the channel to change the ratio between the passage of fluid and the movement of said elements.

2. A meter comprising a casing, an arcuate channel formed therein, an intake port communicating with one end of the channel, a discharge port communicating with the other end of the channel, a rotor above the channel, a plurality of vanes carried by the rotor and depending into said channel, the action of the fluid entering the intake port against the vanes causing rotation of the rotor and delivery of fluid from the intake port to the discharge port, the volume of fluid so delivered being in direct ratio to the movement of the rotor.

3. A meter comprising a casing, an arcuate channel formed therein, an intake port communicating with one end of the channel, a discharge port communicating with the other end of the channel, a rotor above the channel, a plurality of vertically reciprocable vanes carried by the rotor and adapted to depend into said channel, the action of the fluid entering the intake port against the vanes causing rotation of the rotor and delivery of fluid from the intake port to the discharge port, the volume of fluid so delivered being in direct ratio to the movement of the rotor, and an indicator mechanism driven by the rotor to indicate the volume of fluid delivered.

4. A meter comprising a casing, an arcuate channel formed therein, an intake port communicating with one end of the channel, a discharge port communicating with the other end of the channel, a rotor, a plurality of vanes carried by the rotor to travel along in said channel, the action of the fluid entering the intake port against the vanes causing rotation of the rotor and delivery of fluid from the intake port to the discharge port, the volume of fluid so delivered being in direct ratio to the movement of the rotor, means for varying the volume of the channel and thereby change the ratio between the volume of fluid delivered and the movement of the rotor.

5. A meter comprising a casing, an arcuate channel formed therein, an intake port communicating with one end of the channel, a discharge port communicating with the other end of the channel, a rotor, a plurality of vanes carried by the rotor to travel along in said channel, the action of the fluid entering the intake port against the vanes causing rotation of the rotor and delivery of fluid from the intake port to the discharge port, the volume of fluid so delivered being in direct ratio to the movement of the rotor, means for varying the volume of the channel and thereby change the ratio between the volume of fluid delivered and the movement of the rotor, and indicating means driven by the rotor and translating the movement of the rotor into amounts of fluid delivered.

6. A meter comprising a casing, an arcuate channel formed therein, an intake port communicating with one end of the channel, a discharge port communicating with the other end of the channel, a rotor, a plurality of vanes carried by the rotor to travel along in said channel, the action of the fluid entering the intake port against the vanes causing rotation of the rotor and delivery of fluid from the intake port to the discharge port, the volume of fluid so delivered being in direct ratio to the movement of the rotor, means for varying the volume of the channel and thereby change the ratio between the volume of fluid delivered and the movement of the rotor, said means comprising a movable bottom in the channel, and means at the exterior of the casing for vertically moving the bottom to change the volume of the channel.

7. A meter comprising a casing, an arcuate channel formed therein, said casing having an intake port communicating with one end of the channel and a discharge port communicating with the other end of the channel, a rotor rotatably supported in the casing over said channel and concentric therewith, vertically reciprocable vanes carried by the rotor and immovable circumferentially thereof, said vanes being adapted to depend into said channel when in alignment therewith whereby the action of fluid entering the intake port against the vanes will cause rotation of the rotor and delivery of the fluid from the intake port to the discharge port, said vanes being capable of being moved to a position within the rotor as they pass between the ends of the channel.

8. A meter comprising a casing, an arcuate channel formed therein, said casing having an intake port communicating with one end of the channel and a discharge port communicating with the other end of the channel, a rotor rotatably supported in the casing over said channel and concentric therewith, vertically reciprocable vanes carried by the rotor and immovable circumferentially thereof, said vanes being adapted to depend into said channel when in alignment therewith whereby the action of fluid entering the intake port against the vanes will cause rotation of the rotor and delivery of the fluid from the intake port to the discharge port, said vanes being capable of being moved to a position within the rotor as they pass between the ends of the channel, and means positively projecting said vanes into the channel as they align therewith.

9. A meter comprising a casing, an arcuate channel formed therein, said casing having an intake port communicating with one end of the channel and a discharge port communicating with the other end of the channel, a rotor rotatably supported in the casing over said channel and concentric therewith, vertically reciprocable vanes carried by the rotor and immovable circumferentially thereof, said vanes being adapted to depend into said channel when in alignment therewith whereby the action of fluid entering the intake port against the vanes will cause rotation of the rotor and delivery of the fluid from the intake port to the discharge port, said vanes being capable of being moved to a position within the rotor as they pass between the ends of the channel, and means for varying the depth of said channel and thereby change the ratio between the volume of fluid delivered and the movement of the rotor.

10. A meter comprising a casing, an arcuate channel formed therein, said casing having an intake port communicating with one end of the channel and a discharge port communicating with the other end of the channel, a rotor rotatably supported in the casing over said channel and concentric therewith, vertically reciprocable vanes carried by the rotor and immovable circumferentially thereof, said vanes being adapted to depend into said channel when in alignment therewith whereby the action of fluid entering the intake port against the vanes will cause rotation of the rotor and delivery of the fluid from the intake port to the discharge port, said vanes being capable of being moved to a position within the rotor as they pass between the ends of the channel, means positively projecting said vanes into the channel as they align therewith, and means for varying the volume of the channel and thereby change the ratio between the volume of fluid delivered and the movement of the rotor.

ALBERT J. GRANBERG.